United States Patent
Hwang et al.

(10) Patent No.: US 10,541,408 B2
(45) Date of Patent: Jan. 21, 2020

(54) ACTIVE MATERIAL FOR LITHIUM SECONDARY BATTERY COMPOSITE ELECTRODE FOR IMPROVING OUTPUT AND LITHIUM SECONDARY BATTERY INCLUDING THE ACTIVE MATERIAL

(71) Applicant: LG Chem, Ltd., Seoul (KR)

(72) Inventors: Sun Jung Hwang, Daejeon (KR); Sin Kyu Kim, Daejeon (KR); Yong Tae Lee, Daejeon (KR); Hyun Kuk Noh, Daejeon (KR); Geun Chang Chung, Daejeon (KR); Keun Wan An, Daejeon (KR)

(73) Assignee: LG Chem, Ltd. (KR)

(*) Notice: Subject to any disclaimer, the term of this patent is extended or adjusted under 35 U.S.C. 154(b) by 290 days.

(21) Appl. No.: 13/738,428

(22) Filed: Jan. 10, 2013

(65) Prior Publication Data

US 2013/0280610 A1 Oct. 24, 2013

Related U.S. Application Data

(63) Continuation of application No. PCT/KR2012/003149, filed on Apr. 24, 2012.

(51) Int. Cl.
*H01M 4/36* (2006.01)
*H01M 4/58* (2010.01)
(Continued)

(52) U.S. Cl.
CPC ........... *H01M 4/131* (2013.01); *H01M 4/364* (2013.01); *H01M 4/505* (2013.01); *H01M 4/525* (2013.01);
(Continued)

(58) Field of Classification Search
CPC ...... H01M 4/362; H01M 4/364; H01M 4/505; H01M 4/525
(Continued)

(56) References Cited

U.S. PATENT DOCUMENTS

| 6,566,011 B1 | 5/2003 | Takeda et al. |
| 2003/0170540 A1 | 9/2003 | Ohzuku et al. |

(Continued)

FOREIGN PATENT DOCUMENTS

| CN | 1905265 A | 1/2007 |
| CN | 101288197 A | 10/2008 |

(Continued)

OTHER PUBLICATIONS

Wu et al., Effect of precursor and synthesis temperature on the structural and electrochemical properties of Li(Ni0.5Co0.2Mn0.3)O2, May 2012, Electrochimica Acta, 75, 393-398.*

(Continued)

*Primary Examiner* — Jonathan G Leong
(74) *Attorney, Agent, or Firm* — Lerner, David, Littenberg, Krumholz & Mentlik, LLP

(57) ABSTRACT

Provided is a composite electrode for a lithium secondary battery for improving output and a lithium secondary battery including the composite electrode, in which, in a composite electrode having two or more active materials mixed therein, an active material having a small particle size is included in the composite electrode by being coagulated and secondarily granulated so as to allow mixed active material particles to have a uniform size, and thus, electrical conductivity is improved to have high output characteristics.

15 Claims, 1 Drawing Sheet

(51) Int. Cl.
*H01M 4/131* (2010.01)
*H01M 4/525* (2010.01)
*H01M 4/505* (2010.01)
H01M 4/62 (2006.01)
H01M 10/052 (2010.01)
H01M 10/0525 (2010.01)

(52) U.S. Cl.
CPC .......... *H01M 4/5825* (2013.01); *H01M 4/625* (2013.01); *H01M 10/052* (2013.01); *H01M 10/0525* (2013.01)

(58) Field of Classification Search
USPC ....... 429/218.1, 221, 223, 224, 231.1, 231.3
See application file for complete search history.

(56) References Cited

U.S. PATENT DOCUMENTS

| | | | |
|---|---|---|---|
| 2005/0181279 | A1 | 8/2005 | Hosoya |
| 2006/0083989 | A1* | 4/2006 | Suhara ................ C01G 53/006 429/231.3 |
| 2007/0026315 | A1* | 2/2007 | Lampe-Onnerud et al. ................ 429/224 |
| 2007/0026316 | A1* | 2/2007 | Imachi et al. ................ 429/232 |
| 2007/0111098 | A1 | 5/2007 | Yang Kook et al. |
| 2008/0008933 | A1 | 1/2008 | Lampe-Onnerud |
| 2009/0142668 | A1* | 6/2009 | Ishii ............................ 429/231.8 |
| 2009/0155689 | A1* | 6/2009 | Zaghib ................ H01M 4/364 429/221 |
| 2009/0226811 | A1* | 9/2009 | Nakaoka ................ H01B 1/08 429/223 |
| 2010/0081055 | A1 | 4/2010 | Konishi et al. |
| 2010/0176352 | A1* | 7/2010 | Chen ...................... C01G 51/42 252/521.2 |
| 2010/0190061 | A1 | 7/2010 | Green |
| 2010/0233540 | A1* | 9/2010 | Choy et al. .................... 429/220 |
| 2011/0223482 | A1 | 9/2011 | Fujii et al. |
| 2012/0015250 | A1 | 1/2012 | Teng et al. |
| 2013/0045421 | A1* | 2/2013 | Kobino ................ C01G 45/006 429/223 |
| 2013/0065118 | A1 | 3/2013 | Chang et al. |
| 2013/0209879 | A1* | 8/2013 | Nagai .................... H01M 4/131 429/211 |
| 2013/0323598 | A1* | 12/2013 | Liu ....................... H01M 4/505 429/223 |

FOREIGN PATENT DOCUMENTS

| | | |
|---|---|---|
| CN | 101447586 A | 6/2009 |
| CN | 102210047 A | 10/2011 |
| EP | 2555286 A2 | 2/2013 |
| JP | 2007-207490 A | 8/2007 |
| JP | 2008-071763 A | 3/2008 |
| JP | 2010219047 A | 9/2010 |
| JP | 2011113783 A | 6/2011 |
| KR | 20030038543 | 5/2003 |
| KR | 20040007356 A | 1/2004 |
| KR | 20040078522 A | 9/2004 |
| KR | 20100044143 A | 4/2010 |
| KR | 20120053880 A | 5/2012 |
| WO | WO 2010053174 A1 * | 5/2010 |
| WO | 2011/122865 A2 | 10/2011 |

OTHER PUBLICATIONS

European Search Report, EP 12839209.9, dated Mar. 7, 2014.
Office Action from corresponding Chinese Application No. 201280003083.9, dated Apr. 1, 205.
Office Action from European Application No. 12 839 209.9, dated Apr. 13, 2015.

* cited by examiner

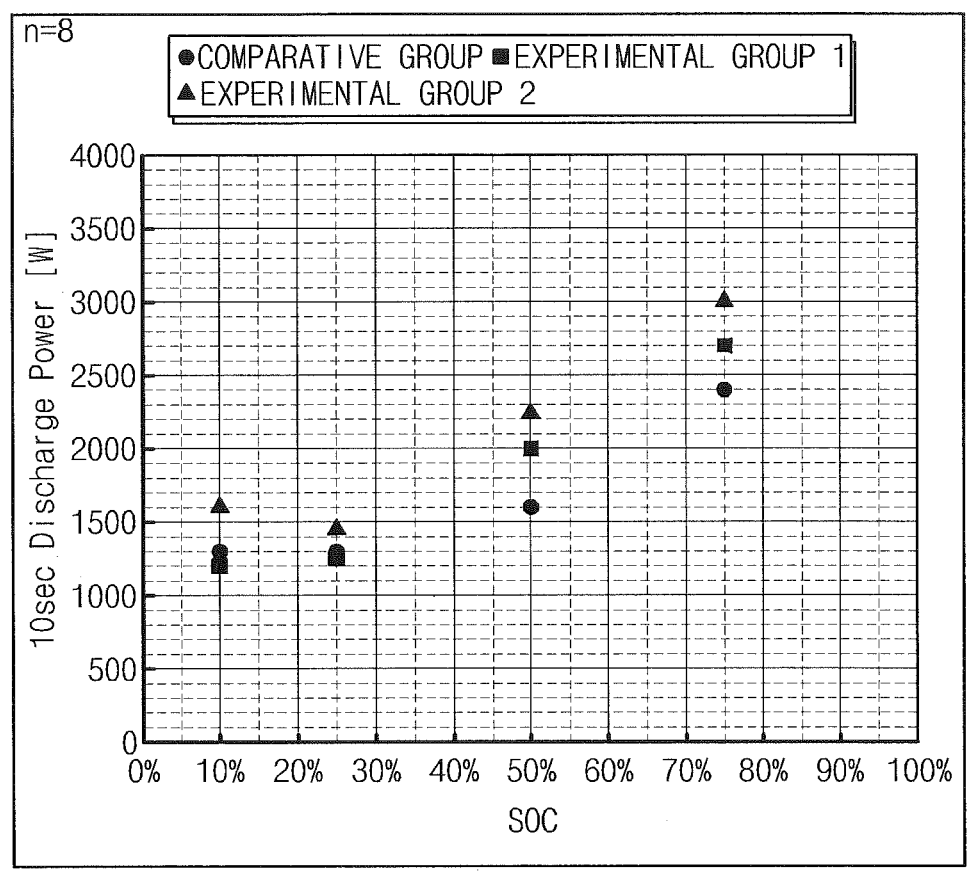

ACTIVE MATERIAL FOR LITHIUM SECONDARY BATTERY COMPOSITE ELECTRODE FOR IMPROVING OUTPUT AND LITHIUM SECONDARY BATTERY INCLUDING THE ACTIVE MATERIAL

CROSS-REFERENCE TO RELATED APPLICATIONS

This application is a continuation of International Application No. PCT/KR2012/003149 filed on Apr. 24, 2012.

BACKGROUND OF THE INVENTION

The present invention disclosed herein relates to an active material for a lithium secondary battery composite electrode for improving output and a lithium secondary battery including the active material, and more particularly, to an electrode for a lithium secondary battery and a lithium secondary battery including the electrode, in which, in a composite electrode having two or more active materials mixed therein, an active material having a small particle size forms the composite electrode by being coagulated and secondarily granulated so as to allow mixed active material particles to have a uniform size range, and thus, electrical conductivity is improved to have high output characteristics.

In line with increasing technological development and demand relating to mobile devices, demand for secondary batteries as an energy source has been increased. Among such secondary batteries, lithium secondary batteries having high energy density and voltage, long cycle lifetime, and low self-discharge rate have been commercialized and widely used. Also, in line with growing concerns about environmental issues, a significant amount of research into electric vehicles and hybrid electric vehicles able to replace fossil fuel vehicles such as gasoline vehicle and diesel vehicle, one of major causes of air pollution, has been actively conducted. Recently, research into applying lithium secondary batteries having high energy density and discharge voltage as a power source of such electric vehicles and hybrid electric vehicles has been actively conducted and some of the research are in a commercialization stage.

In particular, various types of research into the development of a cathode material of a large capacity lithium secondary battery for an electric vehicle have been conducted in order to replace currently used $LiMn_2O_4$, and recently, a great deal of research into using $LiNi_xMn_yCo_{1-x-y}O_2$ ternary layered oxide has been conducted in order to develop a high capacity battery.

However, with respect to the ternary layered oxide, since there are limitations in stability during overcharge, research into a composite electrode using the ternary layered oxide and $LiMPO_4$ (M=Fe, Mn, Co, and Ni) lithium metal phosphate having an olivine structure without $O_2$ discharge during overcharge, in particular, $LiFePO_4$ using Fe, in a cathode active material has been actively conducted in order to resolve such limitations. The foregoing composite electrode has higher capacity in comparison to that of a single component electrode and may be better in terms of lifetime characteristics and overcharge safety. Therefore, a lithium secondary battery used as a power source of medium and large sized devices may be provided.

However, with respect to the composite electrode including $LiFePO_4$ as above, since electrical conductivity may be poor, a technique of preparing an electrode by increasing a content of a conductive agent has been known. However, with respect to the electrode prepared by using the foregoing method, output characteristics of a lithium secondary battery may be difficult to be improved, because large electrical resistance may be manifested during discharge of the lithium secondary battery.

Accordingly, improving electrical conductivity of an electrode has become an important issue in research on a lithium secondary battery. In particular, with respect to a lithium secondary battery used as a power source of medium and large sized devices, since high output characteristics are required and a phenomenon of a rapid decrease in output must be prevented, there is an urgent need for introducing a technique to resolve the foregoing limitations.

Typically, in order to improve conductivity of an electrode formed of a composite having two or more components, a method of adding a larger amount of a conductive agent to the electrode has been attempted.

However, a binder must be added together for bonding between active material particles or disposing the active material on an electrode current collector, in order to form an electrode. The larger the content of the conductive agent included in the electrode increases, the larger the content of the binder having no electrical conductivity also increases. As a result, when large amounts of the conductive agent and the binder are included, a thickness of the electrode may not only increase, but energy density of the electrode may also significantly decrease because an amount of the active material in the electrode is relatively reduced and electrical conductivity may decrease as much as the content of the included binder.

Therefore, typically, a resultant effect of improving electrical conductivity of an electrode active material may be insufficient in spite of adding a large amount of a conductive agent and decreases in capacity and output characteristics of a secondary battery may rather occur.

SUMMARY OF THE INVENTION

After conducting in-depth research and various experimentations, the inventors of the present invention found a cause of a decrease in electrical conductivity of an electrode composed of a composite having two or more compounds mixed therein as above.

This is the result of a difference in particle sizes between components having different electrical conductivities. That is, the reason for this is that a difference in surface areas becomes large when the difference in particle sizes between two or more mixed materials is large and thus, an absolute amount of a conductive agent included in the electrode is concentrated on any one compound having a larger surface area.

That is, when the conductive agent is concentrated on any one active material having a larger surface area, an absolute amount of the conductive agent distributed on a surface of the other active material becomes relatively less, and high resistance may rather be obtained because the absolute amount of the conductive agent becomes insufficient in comparison to the case that an electrode composed of a single component is used.

As a result, electrical conductivity of the entire electrode may decrease, and the foregoing limitations may be repeated even in the case that the amount of the conductive agent may be continuously increased and thus, the same result may be obtained.

The present invention provides a composite electrode for a lithium secondary battery, in which a difference in particle sizes between two or more active materials is minimized to uniformly distribute a conductive agent in a composite electrode composed of two or more active materials and as a result, electrical conductivity is significantly improved even without adding an excessive amount of the conductive agent to the composite electrode.

The present invention also provides a high-capacity lithium secondary battery having significantly improved output characteristics by including the foregoing electrode.

Embodiments of the present invention provide composite electrodes including two or more active materials, wherein particles (primary particles) of an active material (a small particle active material) having a relatively smallest particle size among the two or more active materials are coagulated and secondarily granulated (secondary particles) to have a particle size similar to those of other mixed active materials.

In some embodiments, the primary particles of the small particle active material may be composed of nano-sized particles.

In other embodiments, the nano-sized primary particles may have a size range of about 5 nm to about 200 nm.

In still other embodiments, the small particle active material may be included in an amount range of about 10 wt % to about 60 wt % based on a total amount of the composite electrode.

In even other embodiments, the secondary particles included in the small particle active material may be included in an amount range of about 30 wt % to about 100 wt % of a total amount of the small particle active material.

In yet other embodiments, the secondary particles of the small particle active material may be prepared by coagulating the primary particles and a conductive agent.

In further embodiments, the conductive agent may be included in an amount range of about 0.5 wt % to about 5 wt % based on a total weight of the secondary particles.

In still further embodiments, the conductive agent may be a mixture of one or more selected from the group consisting of carbon black including acetylene black, Ketjen black, channel black, furnace black, lamp black, or thermal black, or a material having a crystal structure of graphene or graphite.

In even further embodiments, the composite electrode may be a cathode.

In yet further embodiments, the small particle active material may be an olivine-structured active material expressed as Chemical Formula 1 below:

LiMPO$_4$ [Chemical Formula 1]

(where M is one or more elements selected from the group consisting of cobalt (Co), nickel (Ni), manganese (Mn), and iron (Fe).

In much further embodiments, the small particle active material may be LiFePO$_4$.

In still further embodiments, the composite electrode active material may further include ternary lithium-containing metal oxide expressed as Chemical Formula 2 in addition to LiFePO$_4$:

LiNi$_x$Mn$_y$Co$_{1-x-y}$O$_2$, 0<x<0.5, 0<y<0.5. [Chemical Formula 2]

In even further embodiments, the ternary lithium-containing metal oxide may be Li[Ni$_{1/3}$Co$_{1/3}$Mn$_{1/3}$]O$_2$.

In yet further embodiments, the composite electrode may further include a mixture of one or more selected from the group consisting of lithium cobalt oxide, lithium nickel oxide, lithium cobalt-nickel oxide, lithium cobalt-manganese oxide, lithium manganese-nickel oxide, lithium cobalt-nickel-manganese oxide, lithium-containing olivine-type phosphate, and oxides having other elements substituted or doped therein, and the other elements may be one or more elements selected from the group consisting of aluminum (Al), magnesium (Mg), manganese (Mn), nickel (Ni), cobalt (Co), chromium (Cr), vanadium (V), and iron (Fe).

In some embodiments, the composite electrode may include a binder and a conductive agent in an amount of about 10 wt % or less based on the total amount of the composite electrode.

In other embodiments of the present invention, lithium secondary batteries include the composite electrode.

In other embodiments, the lithium secondary battery may be used as a unit cell of a battery module, a power source of a medium and large sized device, and the medium and large sized device may be a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a graph showing changes in resistances and outputs according to each state of charge (SOC) of lithium secondary batteries according to Examples and Comparative Examples of the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In a composite electrode having two or more active materials mixed therein, the present invention provides a composite electrode, in which particles (hereinafter, referred to as "primary particles") of the active material having a relatively smaller particle size (hereinafter, referred to as "small particle active material") are included in the composite electrode by being coagulated and secondarily granulated (hereinafter, referred to as "secondary particles") to a particle size similar to those of other mixed active materials so as to reduce a difference in particle sizes between the active materials.

In particular, the primary particles of the small particle active material may be nano-sized.

Hereinafter, the present invention will be described in detail.

In a composite electrode having two or more active materials mixed therein, the present invention allows primary particles of the active material (small particle active material) composed of particles having a relatively smaller size to be secondarily granulated by coagulating and drying the primary particles, when there is a difference in particle sizes between the mixed active materials.

When the difference in primary particle sizes between the two or more active materials constituting the composite electrode is large, decreases in electrical conductivity and output characteristics of the electrode may be generated as described above.

Accordingly, in the present invention, the primary particles of the small particle active material are coagulated and secondarily granulated so as to have a size uniform with particle sizes of other active materials included in the composite electrode, and thus, there may be almost no difference in the particle sizes between the two or more active materials included in the composite electrode. Therefore, according to the present invention, electrical conductivity of the composite electrode including two or more active materials may be increased by reducing a phenomenon in which a conductive agent is concentrated on any one active material having a larger specific surface area.

In particular, the primary particles of the small particle active material may be nano-sized. For example, the active material may be composed of primary particles having a size range of 5 nm to 200 nm.

When the primary particle size is within the foregoing range, the primary particles may be coagulated and secondarily granulated. When the primary particles are secondarily granulated to be included in the composite electrode, the effect expected by the present invention may be maximized.

A method of coagulating and secondarily granulating the primary particles of the small particle active material according to the present invention is not particularly limited so long as the primary particles are coagulated and granulated by using a known method.

For example, primary particles of a small particle active material together with water are put into a stirrer and stirred to prepare a mixture, and the mixture is then coagulated by using a centrifugal spray drying. Thereafter, secondary particles may be prepared by drying and pressing.

The secondary particles may be prepared to have a particle size equivalent to those of the other active materials included in the composite electrode together with the small particle active material, but, in consideration of errors in a preparation process, secondary particles having a smaller size may be further included in addition to the secondary particles having a size uniform with those of the other active materials. The size of the particles may vary according to a preparation process.

The size of the secondary particles prepared by coagulating the primary particles of the small particle active material is not numerically limited so long as the secondary particles are prepared to have a particle size uniform with those of the other active materials included in the electrode together with the small particle active material.

In the composite electrode including two or more active materials having different particle sizes according to the present invention, a particle size of the small particle active material may become almost uniform with those of the other mixed active materials when the small particle active material is entirely (100%) secondarily granulated to be included in the composite electrode. However, the effect expected by the present invention may be manifested even in the case that 30% or more of a total weight of the small particle active material is secondarily granulated to be included in the composite electrode.

However, when the secondary particles among the small particle active material are included in an amount of less than 30%, an effect of increasing electrical conductivity of the active material is insignificant, and thus, the desired effect expected by the present invention may not be obtained.

Meanwhile, the small particle active material included in the composite electrode may further include particles having a different size in addition to the primary particles and the secondary particles.

That is, particles having a different size in addition to the intrinsic particles (primary particles) of the small particle active material and the secondary particles prepared by coagulating the primary particles may be further included.

The reason for this is that after the primary particles are prepared into the secondary particles, the secondary particles may be broken or deformed in the process of mixing with the other active materials to be pressed into a composite, and thus, the secondary particles may be formed into particles having various sizes.

Also, conductive agents may be added when the secondary particles are prepared. That is, when the secondary particles are prepared, the conductive agent may be mixed with the primary particles to be secondarily granulated. Thus, when the secondary particles are prepared by including the conductive agent, electrical conductivity of surfaces of the secondary particles as well as electrical conductivity inside the secondary particles may improve to sufficiently form conduction paths between two or more mixed electrode active materials. Therefore, resistance of a lithium secondary battery may be significantly reduced by a further increase in electrical conductivity of the electrode.

An amount of the conductive agent included in the secondary particles may be in a range of 0.5 wt % to 5 wt % based on a total weight of the primary particles and the conductive agent may be prepared as secondary particles by being mixed with the primary particles.

When the amount of the included conductive agent is less than 0.5 wt %, sufficient conductive paths between the particles may not be formed and electrical conductivity may not be improved, and when the amount of the included conductive agent is more than 5 wt %, an amount of the active material is relatively decreased, and thus, capacity of the battery may decrease and energy density may decrease.

The conductive agent included in the secondary particles is not particularly limited so long as it has excellent electrical conductivity and does not generate a side reaction in an internal environment of the secondary battery or chemical changes in the battery as well as having conductivity.

Specifically, natural graphite or artificial graphite may be used without limitation as graphite. A carbon-based material having high electrical conductivity may be particularly used as conductive carbon, and specifically, examples of the conductive carbon may be carbon black, such as acetylene black, Ketjen black, channel black, furnace black, lamp black, or thermal black, or a material having a crystal structure of graphene or graphite. Meanwhile, a more desirable effect may be provided when the composite electrode including the secondary particles is a cathode.

In particular, when the primary particles of the small particle active material is nano-sized as described above, the effect expected by the present invention may be maximized. With respect to the cathode, an active material expressed as olivine-structured $LiMPO_4$ (where M is one or more elements selected from the group consisting of cobalt (Co), nickel (Ni), manganese (Mn), and iron (Fe)) is composed of nano-sized (50 nm to 200 nm) primary particles, and thus may be suitable for a small particle compound.

Also, for example, relatively inexpensive $LiFePO_4$ (hereinafter, referred to as "olivine") having high capacity and stable olivine structure among the $LiMPO_4$ (where M is one or more elements selected from the group consisting of Co, Ni, Mn, and Fe) may be used.

The olivine has a theoretical capacity of 170 mAh/g and a standard reduction potential of 3.4 V, and a discharge output may be secured within a range of 3 V because an operating voltage is not high enough to generate a side reaction such as decomposition of an electrolyte and simultaneously, energy density may be maintained and a charge potential is relatively low.

Meanwhile, when the olivine is included in the cathode active material, the olivine may be included in an amount range of 10 wt % to 60 wt % based on a total amount of the cathode active material.

When the olivine is included in an amount of less than 10 wt %, safety of the secondary battery may not be obtained, and when the olivine is included in an amount of greater than 60 wt %, high capacity of the entire cathode may be limited due to low capacity of the olivine.

At this time, 30 wt % to 100 wt % of a total amount of the olivine included in the cathode active material may be prepared as secondary particles.

The reason for this is that when the secondary particles are included in an amount of at least 30 wt % or more, it may be sufficient to resolve limitations generated due to the size difference between the particles of two or more active materials constituting the composite electrode.

Further, for example, the entire (100%) olivine may be secondarily granulated to be included in the cathode.

Since the present invention is characterized by that the small particle active material included in the composite electrode is included by being secondarily granulated, other components included in the composite electrode are not particularly limited. However, a ternary lithium-containing metal oxide (hereinafter, referred to as "ternary") expressed as the following Chemical Formula 1 may be included.

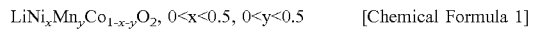

$$\text{LiNi}_x\text{Mn}_y\text{Co}_{1-x-y}\text{O}_2, \ 0<x<0.5, \ 0<y<0.5 \qquad \text{[Chemical Formula 1]}$$

The ternary expressed as Chemical Formula 1 may be Li[Ni$_{1/3}$Co$_{1/3}$Mn$_{1/3}$]O$_2$ composed of the same amounts of Ni, Co, Mn.

Since the ternary compound may manifest relatively high capacity, the ternary compound may be suitable for preparing a high capacity/high output secondary battery.

According to the present invention, since the secondary particles of the small particle active material included in the composite electrode must be prepared to have a size equivalent to those of the other active material particles, the small particle active material must be secondarily granulated to a size range of 5 μm to 20 μm so as to have a particle size range similar to that (5 μm to 20 μm) of the ternary when the ternary active material is included in the composite electrode.

According to an embodiment of the present invention, for example, the composite electrode may be a cathode, the two or more active materials included in the cathode may be a ternary lithium-containing metal oxide expressed as Chemical Formula 1, and the small particle active material may be olivine.

At this time, the olivine may be included in an amount range of 10 wt % to 60 wt % with respect to a total amount of the cathode. When the olivine is included in an amount of less than 10 wt %, safety of the secondary battery may not be obtained, and when the olivine is included in an amount of greater than 60 wt %, high capacity of the entire cathode may be limited due to low capacity of the olivine-structured LiFePO$_4$.

Since the olivine is composed of primary particles having a size range of 50 nm to 200 nm, the olivine may be secondarily granulated to a size range of 5 μm to 20 μm so as to have a particle size similar to that of the ternary lithium-containing metal oxide.

The olivine secondary particles thus prepared are allowed to be included in an amount of at least 30 wt % or more of the total amount of the olivine included in the cathode. When the olivine secondary particles are included in an amount of less than 30 wt %, the conductive agent is concentrated only on the olivine due to a marked difference with respect to the ternary particles, and thus, low electrical conductivity of the cathode may not be improved.

Meanwhile, the olivine included in the cathode may further include particles having a different size generated by breaking or deforming the secondary particles during a process of preparing the cathode in addition to the secondary particles having a size similar to those of the primary particles and the ternary particles. Even in the case that the particles having a different size are further included, electrical conductivity of the cathode may be more improved in comparison to the case that the olivine is only composed of primary particles.

The cathode according to the present invention may further include the following lithium-containing metal oxide in addition to the secondary particles and the ternary lithium-containing metal oxide of Chemical Formula 1.

That is, the lithium-containing metal oxide may be various active materials known in the art, and may include lithium cobalt oxide, lithium nickel oxide, lithium cobalt-nickel oxide, lithium cobalt-manganese oxide, lithium manganese-nickel oxide, lithium cobalt-nickel-manganese oxide, lithium-containing olivine-type phosphate, and oxides having other elements substituted or doped therein, and the other elements may be one or more elements selected from the group consisting of aluminum (Al), magnesium (Mg), manganese (Mn), nickel (Ni), cobalt (Co), chromium (Cr), vanadium (V), and iron (Fe).

Also, in the present invention, a conductive agent, a binder, and a filler may be selectively further included in the foregoing composite electrode.

When an amount of the conductive agent and the binder is too small, the desired effect may not be obtained, and on the other hand, the amount is too large, capacity may decrease because the amount of the active material relatively decreases. Therefore, the conductive agent and the binder may be included in an amount of 10 wt % or less based on a total amount of the composite electrode, and for example, may be included in an amount range of 3 wt % to 10 wt %.

The conductive agent is not particularly limited so long as it does not generate chemical changes in the battery as well as having conductivity. Examples of the conductive agent may be graphite such as natural graphite or artificial graphite; carbon black such as acetylene black, Ketjen black, channel black, furnace black, lamp black, or thermal black; conductive fibers such as carbon fibers or metal fibers; metal powder such as fluorocarbon powder, aluminium powder, or nickel powder; conductive whiskers such as zinc oxide or potassium titanate; conductive metal oxide such as titanium oxide; a conductive material such as a polyphenylene derivative, etc.

The conductive agent included in the composite electrode according to the present invention may be uniformly distributed without concentrating any one active material among two or more active materials in the composite electrode. As a result, conductivity of the electrode may be significantly improved by only a small amount of the conductive agent.

The binder is a component that assists in bonding between the active material and the conductive agent and bonding with respect to a current collector. Examples of the binder may be polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluorine rubber, various copolymers, etc.

Also, the filler is selectively used as a component that prevents expansion of the electrode and is not particularly limited so long as it does not generate chemical changes in the battery as well as being a fibrous material. Examples of the filler may be olivine-based polymers such as polyethylene and polypropylene; and fibrous materials such as glass fibers and carbon fibers.

Also, a slurry formed by mixing cathode materials, such as the cathode active material, conductive agent, binder, and filler, in a solvent such as N-methylpyrrolidone (NMP) is coated on a cathode current collector, and then a composite electrode, for example, may be prepared by drying and rolling.

The current collector generally has a thickness range of 3 μm to 500 μm. The cathode current collector is not particularly limited so long as it does not generate chemical changes in the battery as well as having high conductivity. Examples of the cathode current collector may be stainless steel, aluminium, nickel, titanium, sintered carbon, or aluminium or stainless steel surface treated with carbon, nickel, titanium, silver, etc. Fine irregularities may also be formed on a surface of the current collector to increase adhesion of the active material, and the current collector may have various forms such as a film, sheet, foil, net, porous body, foam, or nonwoven fabric.

The anode current collector is also not particularly limited so long as it does not generate chemical changes in the battery as well as having conductivity. Examples of the anode current collector may be copper, stainless steel, aluminium, nickel, titanium, sintered carbon, copper or stainless steel surface treated with carbon, nickel, titanium, or silver, an aluminum-cadmium alloy, etc. Also, adhesion of an anode active material may also be increased by forming fine irregularities on a surface of the anode current collector like the cathode collector, and the anode current collector may be used as various forms such as a film, sheet, foil, net, porous body, foam, or nonwoven fabric.

The present invention also provides a lithium secondary battery composed of the composite electrode, a separator, and a lithium salt-containing non-aqueous electrolyte.

The separator is disposed between the cathode and anode, and an insulating thin film having high ion permeability and mechanical strength is used as the separator. The separator generally has a pore diameter range of 0.01 μm to 10 μm and has a thickness range of 5 μm to 300 μm. For example, a sheet or nonwoven fabric formed of an olefin-based polymer, such as chemical resistant and hydrophobic polypropylene; and glass fibers or polyethylene is used as the separator. When a solid electrolyte, such as a polymer, is used as an electrolyte, the solid electrolyte may also be used as the separator.

The lithium salt-containing non-aqueous electrolyte is composed of a non-aqueous electrolyte and a lithium salt. A non-aqueous organic solvent, an organic solid electrolyte, and an inorganic solid electrolyte may be used as the non-aqueous solvent.

Examples of the non-aqueous organic solvent may be aprotic organic solvents such as N-methyl-2-pyrrolidone, propylene carbonate, ethylene carbonate, butylene carbonate, dimethyl carbonate, diethyl carbonate, γ-butyrolactone, 1,2-dimethoxyethane, tetrahydroxy franc, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, a polymer including an ionic dissociation group, etc.

Examples of the inorganic solid electrolyte may be nitrides, halides, or sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material suitable for being dissolved in the non-aqueous electrolyte, and for example, $LiCl$, $LiBr$, $LiI$, $LiClO_4$, $LiBF_4$, $LaB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate, and imide may be used.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride or the like, for example, may be added to the non-aqueous electrolyte.

In some cases, in order to provide incombustibility, halogen-containing solvents, such as carbon tetrachloride and ethylene trifluoride, may be further included, and carbon dioxide gas may be further included in order to improve high-temperature storage characteristics.

The secondary battery according to the present invention may not only be used in a battery cell used as a power source of a small device, but may also be used as a unit cell in a medium and large sized battery module including a plurality of battery cells.

Preferred examples of the medium and large sized device may be a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system, but the medium and large sized device is not limited thereto.

Hereinafter, the present invention will be described in detail, according to specific examples. However, the following examples are merely presented to exemplify the present invention, and the scope of the present invention is not limited thereto.

EXAMPLE 1

Preparation of Secondary Particles

Olivine-structured $LiFePO_4$ powder together with water was put into a stirrer and mixed to prepare a slurry, and the slurry was then coagulated and dried by using a centrifugal spray drying method to prepare 10 μm-sized secondary particles.

Preparation of Cathode

A cathode active material including 20 wt % of a material, in which LiFePO$_4$ secondary particles prepared by using the foregoing method and general LiFePO$_4$ were mixed in a ratio of 50:50, 60 wt % of Li[Ni$_{1/3}$Co$_{1/3}$Mn$_{1/3}$]O$_2$, 7 wt % of graphite, 7 wt % of Denka black, and 6 wt % of polyvinylidene fluoride (PVDF) was prepared. Specifically, Li[Ni$_{1/3}$Co$_{1/3}$Mn$_{1/3}$]O$_2$, LiFePO$_4$, graphite, and Denka black having the foregoing content ratio were ground and sieved, and then coated with 6 wt % of PVDF as a binder to prepare a cathode material. A cathode current collector was coated with the cathode material, and then rolled and dried to prepare a cathode for a secondary battery.

Preparation of Secondary Battery

The cathode thus prepared was included, a porous polyethylene separator was disposed between the cathode and an anode based on graphite, and a lithium electrolyte was injected to prepare a polymer-type lithium secondary battery.

The polymer-type lithium secondary battery was subjected to formation at 4.2 V and output was then measured according to state of charge (SOC) while charging and discharging were preformed between 4.2 V and 2.5 V. (C-rate=1 C).

EXAMPLE 2

A polymer lithium secondary battery was prepared in the same manner as Example 1 except that 100% of LiFePO$_4$ was secondarily granulated to be included in a cathode active material.

COMPARATIVE EXAMPLE

A polymer lithium secondary battery was prepared in the same manner as Example 1 except that LiFePO$_4$ was not secondarily granulated and included as it is in a cathode active material.

Changes in output according to SOC in a voltage range of 3 V to 4.2 V were measured for full cell lithium secondary batteries prepared according to Examples and Comparative Examples, respectively. The results thereof are presented in FIG. 1.

Data shown in FIG. 1 were only an example, specific power values according to SOC may vary according to a specification of a cell. Therefore, the tendency of the graph may be more important than the specific values.

From such a point of view, referring to FIG. 1, it may be confirmed that a much higher level of output was obtained over an entire SOC range with respect to the lithium secondary battery according to Example 1 of the present invention in comparison to the lithium secondary battery according to Comparative Example. With respect to Example 2, an amount of output was smaller than that of Comparative Example as resistance increases in a low SOC range, but it was confirmed that an amount of output higher than that of Comparative Example was obtained in the entire SOC range except the low SOC range.

This may be attributed to the fact that a difference between particles of two or more active materials included in the composite electrode according to the present invention decreased and thus the conductive agent was uniformly distributed in the composite electrode to improve electrical conductivity.

Since output characteristics were significantly improved according to the present invention, a lithium secondary battery having an extended usable SOC range may also be provided.

In a composite electrode including electrode active materials according to the present invention, a difference in particle sizes of mixed components is reduced to uniformly distribute a conductive agent in the compounds and thus, electrical conductivity of the electrode may be significantly improved without adding an excessive amount of the conductive agent. As a result, electrical resistance of a lithium secondary battery is reduced and high output characteristics may be obtained. Therefore, a lithium secondary battery having a wide usable state of charge (SOC) range may be provided.

In particular, when used as a medium and large sized battery used in a power source such as an electric vehicle, a medium and large sized lithium secondary battery able to sufficiently satisfy conditions, such as required output characteristics, capacity, and safety, may be provided.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A composite electrode comprising:
   a current collector; and
   a single layer disposed on the current collector, wherein the single layer comprises a mixture of secondary particles of a first active material and particles of a second active material,
   wherein the secondary particles comprise primary particles of the first active material and a conductive agent, wherein the primary particles have a particle size ranging from about 5 nm to about 200 nm, wherein the conductive agent is present on the surface of and inside of the secondary particles, and wherein the conductive agent is included in an amount range of 0.5 wt % to 5 wt % based on a total weight of the secondary particles,
   wherein the particles of the second active material consist essentially of primary particles of the second active material having a particle size ranging from about 5 μm to about 20 μm,
   wherein the secondary particles of the first active material have a particle size uniform with the particles of the second active material,
   wherein the secondary particles are present in an amount ranging from about 30 wt % to about 80 wt % of a total amount of the first active material in the composite electrode,
   wherein the first active material is LiFePO$_4$, and
   wherein the second active material is ternary lithium-containing metal oxide expressed as Chemical Formula 2:

$$\text{LiNi}_x\text{Mn}_y\text{Co}_{1-x-y}\text{O}_2, \ 0<x<0.5, \ 0<y<0.5 \quad \text{[Chemical Formula 2]}.$$

2. The composite electrode of claim 1, wherein the first active material is included in an amount range of about 10 wt % to about 60 wt % based on a total amount of the composite electrode.

3. The composite electrode of claim 1, wherein the conductive agent is a mixture of one or more selected from the group consisting of carbon black including acetylene black, Ketjen black, channel black, furnace black, lamp black, or thermal black, or a material having a crystal structure of graphene or graphite.

4. The composite electrode of claim 1, wherein the composite electrode is a cathode.

5. The composite electrode of claim 1, wherein the second active material is ternary lithium-containing metal oxide expressed as Chemical Formula 2:

$$\text{LiNi}_x\text{Mn}_y\text{Co}_{1-x-y}\text{O}_2, \quad \tfrac{1}{3} \leq x < 0.5, \quad \tfrac{1}{3} \leq y < 0.5. \quad \text{[Chemical Formula 2]}$$

6. The composite electrode of claim 5, wherein the ternary lithium-containing metal oxide is $\text{Li}[\text{Ni}_{1/3}\text{Co}_{1/3}\text{Mn}_{1/3}]\text{O}_2$.

7. The composite electrode of claim 6, wherein the composite electrode further comprises a mixture of one or more selected from the group consisting of lithium cobalt oxide, lithium nickel oxide, lithium cobalt-nickel oxide, lithium cobalt-manganese oxide, lithium manganese-nickel oxide, lithium cobalt-nickel-manganese oxide, lithium-containing olivine-type phosphate, and oxides having other elements substituted or doped therein, and the other elements are one or more elements selected from the group consisting of Al (aluminum), Mg (magnesium), Mn (manganese), Ni (nickel), Co (cobalt), Cr (chromium), V (vanadium), and Fe (iron).

8. The composite electrode of claim 1, further comprising a binder and a second conductive agent in an amount of about 10 wt % or less based on the total amount of the composite electrode.

9. A lithium secondary battery comprising the composite electrode of claim 1.

10. The lithium secondary battery of claim 9, wherein the lithium secondary battery is used as a unit cell of a battery module in a power source of a device.

11. The lithium secondary battery of claim 10, wherein the device is a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; and an electric commercial vehicle or a power storage system.

12. The composite electrode of claim 1, wherein the secondary particles are present in an amount ranging from about 30 wt % to about 70 wt % of a total amount of the first active material in the composite electrode.

13. The composite electrode of claim 1, wherein the secondary particles are present in an amount ranging from about 30 wt % to about 60 wt % of a total amount of the first active material in the composite electrode.

14. The composite electrode of claim 1, wherein the secondary particles are present in an amount ranging from about 30 wt % to about 75 wt % of a total amount of the first active material in the composite electrode.

15. The composite electrode of claim 1, wherein the secondary particles are present in an amount ranging from about 30 wt % to about 50 wt % of a total amount of the first active material in the composite electrode.

* * * * *